United States Patent

Gazzera et al.

[11] 3,727,837
[45] Apr. 17, 1973

[54] TEMPERATURE RESPONSIVE VALVE MECHANISM

[75] Inventors: Raymond W. Gazzera; Donald A. Nordal, both of Scottsdale; Robert A. Null, Temple, all of Ariz.

[73] Assignee: The Garrett Corporation, Los Angeles, Calif.

[22] Filed: June 21, 1971

[21] Appl. No.: 155,359

Related U.S. Application Data

[63] Continuation of Ser. No. 850,479, Aug. 15, 1969, abandoned.

[52] U.S. Cl. .................. 236/87, 91/365, 137/82, 236/93
[51] Int. Cl. ...................... F15b 13/16, G05b 6/04
[58] Field of Search ................. 236/93, 82, 87; 165/40; 137/82; 91/365

[56] References Cited

UNITED STATES PATENTS

| 2,258,366 | 10/1941 | Otto | 236/82 |
|---|---|---|---|
| 3,537,644 | 11/1970 | Davison | 236/85 X |
| 2,789,543 | 4/1957 | Popowsky | 91/365 |
| 3,151,810 | 10/1964 | Puster | 91/365 X |
| 3,272,487 | 9/1966 | Cook et al. | 236/87 X |
| 1,638,053 | 8/1927 | Muller | 236/92 |
| 3,122,318 | 2/1964 | Null | 236/92 X |
| 3,283,581 | 11/1966 | Du Bois et al. | 236/87 X |
| 3,272,487 | 9/1966 | Cook et al. | 236/87 X |
| 2,258,366 | 10/1941 | Otto | 236/82 |

Primary Examiner—William E. Wayner
Attorney—John N. Hazelwood, Jack D. Puffer, Herschel C. Omohundro and Albert J. Miller

[57] ABSTRACT

Valve mechanism has a butterfly with an actuator biased toward valve open position by a spring and toward valve closed position by fluid pressure. Means responsive to the temperature of fluid adjacent the butterfly are provided to effect controlled bleed of pressure from the actuator to cause the butterfly to modulate flow.

12 Claims, 5 Drawing Figures

INVENTORS.
RAYMOND W. GAZZERA
DONALD A. NORDAL
ROBERT A. NULL
BY Herschel C. Omohundro
ATTORNEY

INVENTORS.
RAYMOND W. GAZZERA
DONALD A. NORDAL
BY ROBERT A. NULL

*Herschel C. Omohundro*
ATTORNEY

TEMPERATURE RESPONSIVE VALVE MECHANISM

This application is a continuation of application Ser. No. 850,479, filed Aug. 15, 1969 and now abandoned.

SUMMARY OF THE INVENTION

This invention relates generally to valves, and more particularly to power actuated valves of the fluid pressure regulator-shutoff type. Still more particularly, the invention pertains to valves employed in aircraft environmental control systems to regulate pressure and temperature of air supplied to aircraft passenger and other compartments. An object of this invention is to provide a valve mechanism operative to modulate the flow of air in a duct as a function of the temperature of that air.

Another object of the invention is to provide a valve mechanism which will be responsive to the temperature of the fluid flowing through the valve and yet offer a minimum restriction to flow when the valve is in a fully open condition.

Still another object is to provide a valve mechanism with a temperature responsive element and actuating means for a flow controlling member, the actuating means being of a type which will multiply the relatively small force of the temperature responsive element to effect the operation of the flow controlling member in accordance with temperature change in fluid flowing through the mechanism.

A further object is to provide a valve mechanism having a butterfly flow controlling element and an actuator therefor, the latter having a wall member connected with the butterfly and movable in one direction by fluid pressure, the mechanism also having means responsive to temperature change in the fluid flowing through the mechanism to modulate the fluid pressure applied to the wall to effect control movement of the butterfly.

A still further object is to provide a temperature responsive valve mechanism of the type mentioned in the preceding paragraph in which the temperature responsive means is located adjacent the pivot for the butterfly and is connected to operate means for bleeding fluid pressure from the actuator for the butterfly to effect controlled movement thereof.

Other objects and advantages of the invention will be set forth or made obvious in the following description of one embodiment of the invention selected for illustration in the accompanying drawings.

DESCRIPTION OF THE PREFERRED EMBODIMENTS

Figure 1:
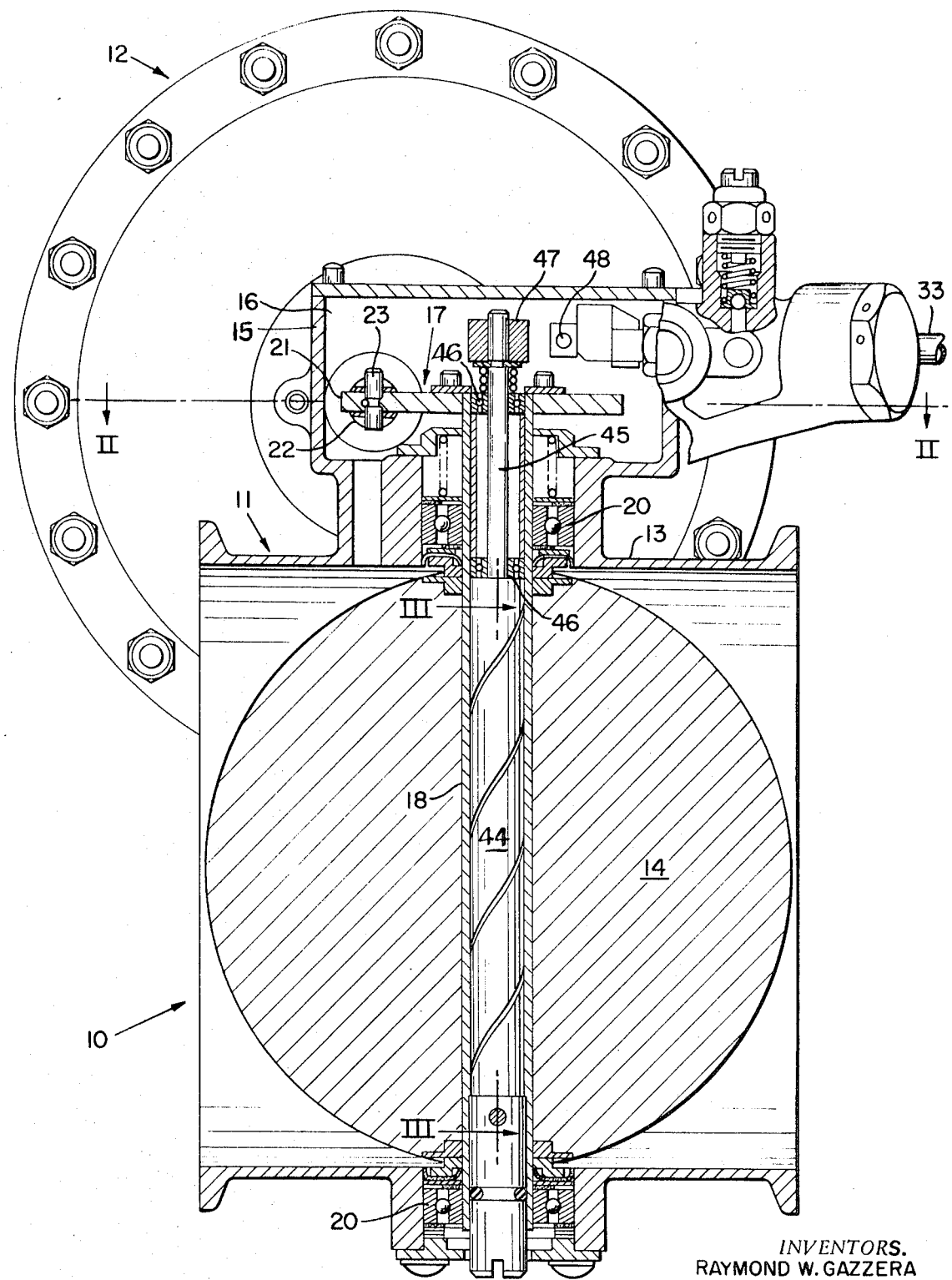
FIG. 1 is an axial sectional view of a valve mechanism formed in accordance with the present invention.

More particular reference to the drawing shows a valve designated generally by the numeral 10 formed in accordance with the present invention. This valve includes two main parts, 11 and 12, part 11 being the valve per se, and part 12 an actuator therefor.

Valve 11 has a body 13 which forms a section of a passage through which the flow to be controlled passes. The body receives a butterfly valve 14 movable between open and closed positions to control the flow of fluid through the passage. The body also includes a portion 15, providing a chamber 16 to receive motion-transmitting means 17 for transferring movement from the actuator to the butterfly valve. The butterfly includes the disk portion and a shaft portion 18, the latter being tubular with sections mounted in bearings 20 to provide for pivotal movement of the butterfly between open and closed positions.

The bearings 20 are suitably supported in the body 13. The shaft 18 extends into the chamber 16 and is provided therein with a disk member having a crank arm 21 projecting from one side. This crank arm has a connecting rod 22 pivotally attached at one end thereto as at 23, the opposite end of the connecting rod being secured to the center portion of a diaphragm assembly 24. This assembly has the peripheral portion thereof clamped between flanges on complemental sections of the actuator housing 25.

The diaphragm assembly includes plates 26 and 27 to receive the central portion of the diaphragm and give support thereto. Plate 26 has a spring adapter 28 provided thereon to locate one end of a coil spring 30, the opposite end of which engages one wall of the actuator housing. The tendency of the spring 30 to expand moves the diaphragm assembly to the position shown in FIG. 2 and disposes the butterfly valve in the passage opening position shown in FIG. 1, this movement being transmitted through the connecting rod and crank arm to the butterfly shaft. The butterfly may be moved to a closed position by supplying fluid under pressure to the outer end of the actuator casing 25. This fluid under pressure moves the diaphragm assembly in opposition to the force of the spring 30, such movement being transmitted by the connecting rod and crank arm to the butterfly shaft.

The mechanism thus far described is substantially conventional and a more detailed description thereof is believed to be unnecessary. The invention herein is directed to the mechanism for controlling the operation of the valve.

Figure 2:
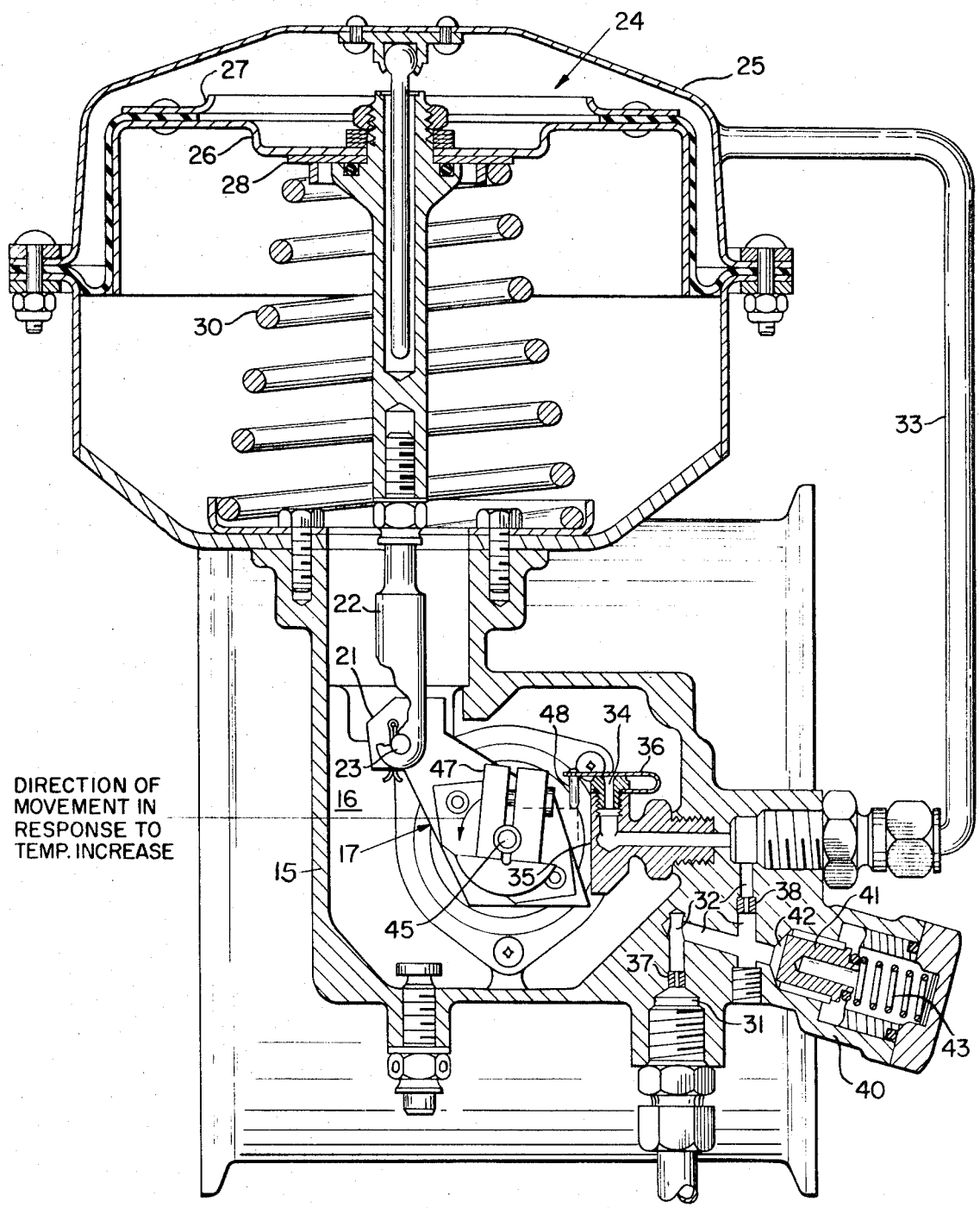
FIG. 2 is a detail horizontal sectional view of the valve shown in FIG. 1, the plane of the section being indicated by the line II—II of such figure.
Figure 3:
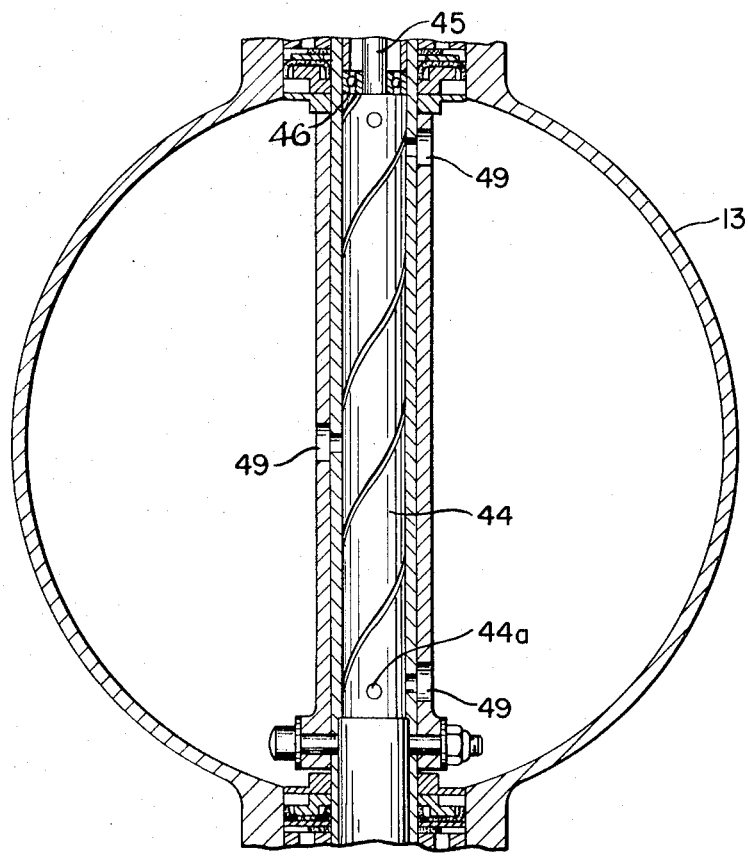
FIG. 3 is a detail vertical sectional view taken through a portion of the valve mechanism on the plane indicated by the line III—III of FIG. 1.
Figure 4:
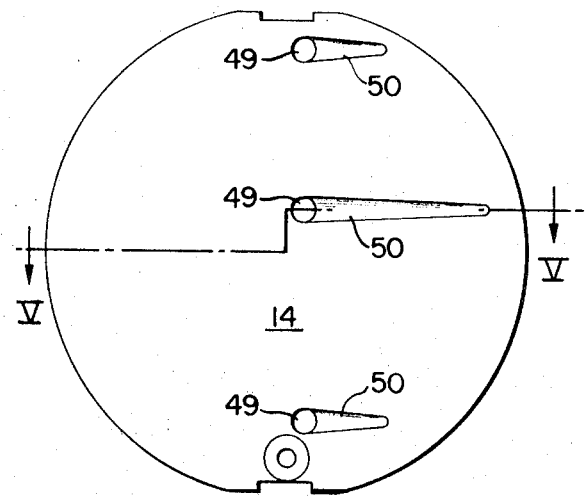
FIG. 4 is a front elevational view of the butterfly element of the valve shown in FIG. 1.
Figure 5:
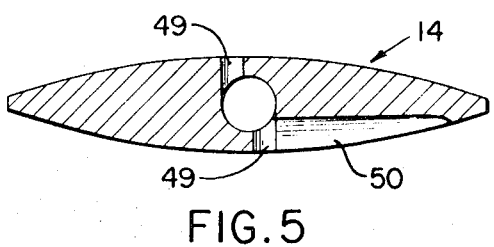
FIG. 5 is a horizontal sectional view through the butterfly valve disk on the planes indicated by the line V—V of FIG. 4.

To effect the movement of the actuator, fluid under pressure is supplied to the outer end of the casing through a passage including an inlet port 31, a plurality of drilled openings 32 formed in the wall of the casing as shown in FIG. 2, and a tube 33 communicating with the drilled openings and the outer end of the actuator casing. It will be obvious that when fluid is so supplied, the diaphragm assembly will move in opposition to the spring 30 and the butterfly valve will move toward a closed position. Such flow of fluid is modulated by control mechanism including a nozzle opening 34 formed in a block 35 secured in the chamber 16. As shown in FIG. 2, the block 35 is provided with drilled holes connecting the nozzle 34 with the drilled holes in the body.

The nozzle 34 is normally closed by a resilient flapper-type bleed valve 36 secured to the block 35 and engaging the wall thereof surrounding the nozzle opening 34. Certain of the drilled holes 32 are provided with orifices 37 and 38 to restrict the flow of fluid through the inlet passage. In the form of the invention shown, a regulator 40 (see FIG. 2) communicates with the passage between the orifices 37 and 38 to limit the fluid pressure in this region to a predetermined value. The regulator is illustrated includes a valve plunger 41 which is urged into engagement with a seat 42 by a spring 43. Other pressure regulating devices may be employed with equal facility.

When the bleed valve 36 is engaged with the surface of the block 35 around the nozzle opening 34, full fluid pressure in the passage will be applied to the diaphragm assembly of the actuator and the butterfly valve will be moved to a closed position. To reduce this pressure in accordance with temperature increase in the passage in body 13, the bleed valve 36 may be moved away from the nozzle opening 34 to permit fluid under pressure to escape, thus decreasing the force applied to the diaphragm assembly.

To effect the operation of the bleed valve 36, a temperature responsive mechanism has been provide. This temperature responsive mechanism includes a torsional bimetallic element 44 disposed in the tubular shaft 18 of the butterfly valve. The element 44 is formed of a bimetallic strip helically wound and is secured at one end to the butterfly shaft, as at 44a, and at the opposite end has a shaft extension 45 projecting therefrom. This extension is supported in bearings 46 which are in turn supported in the portion of the butterfly shaft disposed in chamber 16. The outer end of the extension is provided with an arm 47 for engaging a prong 48 suitably secured to the bleed valve 36. When the butterfly valve is in the open position, the operating end of arm 47 will be disposed at a location remote from the prong 48, as shown in FIG. 2. However, upon the application of fluid pressure to the actuator to move the butterfly to a closed position, the rotation of the butterfly shaft will move the operating end of arm 47 toward the outer end of the prong 48. Fluid supplied to the passage in body 13 will be prevented from flowing therethrough by the closed butterfly. A small flow of fluid, however, may take place through openings 49 formed in the tubular shaft of the butterfly and such fluid will intimately engage the bimetallic element therein. When the temperature of the fluid increases, the element will respond by twisting, causing torque to be transmitted to the extension 45. Predetermined turning movement of this element will cause the arm 47 to engage prong 48 and move flapper valve 36 away from the nozzle 34. Fluid may then bleed from the outer end of the actuator casing, permitting spring 30 to expand and transmit opening movement to the butterfly.

It will be obvious that additional increase in temperature of the fluid will cause a further opening movement of the butterfly, and vice versa. The circulation of fluid from the main passage around the bimetallic element, irrespective of the position of the butterfly disk, is assured by forming holes 49 in the disk and shaft and by providing the disk on the upstream side with grooves 50 communicating with such holes. Thus, even though the butterfly is almost fully open, fluid can flow along the groove and be deflected by the side walls of holes 49 through the aligned openings in the disk and shaft.

When the supply of fluid under pressure to the control mechanism is interrupted, spring 30 will move the diaphragm assembly toward the outer end of the actuator casing, causing the butterfly valve to move to an open position. This movement also withdraws the arm 47 from the vicinity of the prong 48, and bleed valve 36 will close for a subsequent operation.

From the foregoing, it will be apparent that means have been provided to modulate the flow of fluid through a valve controlled passage in accordance with temperature change in the fluid.

We claim:

1. In a valve mechanism:
   casing means forming a passage;
   a main valve element supported in said casing means for movement between passage opening and closing positions;
   fluid pressure responsive means operatively connected with said main valve element to move it in at least one direction;
   means for applying fluid from a pressure source to said fluid pressure responsive means to move said main valve element;
   a bleed valve for modulating the fluid pressure applied to said pressure responsive means; and
   temperature responsive means mechanically integral with said main valve element and movable therewith for controlling said bleed valve in response to the temperature of the fluid controlled by the main valve element.

2. A valve mechanism according to claim 1 in which said main valve element is of the butterfly type and the fluid pressure responsive means serves to move it in a passage closing direction upon an application of pressure to such means.

3. A valve mechanism according to claim 2 in which the temperature responsive means reduces the fluid pressure to cause the main valve element to move in a passage opening direction upon a predetermined temperature change.

4. A valve mechanism according to claim 1 in which resilient means are provided to move said main valve element in a direction opposite that in which it is moved by the fluid pressure responsive means.

5. A valve mechanism according to claim 1 in which said fluid pressure responsive means has a housing forming a chamber divided by diaphragm means into pressure and spring receiving sections, a spring in the latter chamber section to normally dispose said main valve element in a passage opening position.

6. A valve mechanism according to claim 5 in which the means for applying fluid from a pressure source to said pressure responsive means has a fluid line leading to the pressure receiving section of said chamber; spaced flow restrictors in said line; and pressure regulating means communicating with said line between said flow restrictors.

7. In a valve mechanism:
   casing means forming a passage;
   a butterfly valve element supported for pivotal movement in said casing means for movement between passage opening and closing positions;

fluid pressure responsive means operatively connected with said butterfly valve element to move it in a passage closing direction upon application of pressure to said means;

means for applying fluid from a pressure source to said fluid pressure responsive means to move said butterfly valve element;

bleed valve means for effecting a controlled bleed from said fluid pressure responsive means; and a bimetallic temperature responsive means supported in connection with said butterfly valve element and movable therewith for controlling said bleed valve in response to variation in the temperature of fluid in said passage adjacent said butterfly valve element.

8. A valve mechanism according to claim 7 in which the butterfly valve element is provided with restricted openings to expose said bimetallic temperature responsive means to fluid supplied to said passage when said main valve element is in a closed position.

9. A valve mechanism according to claim 7 in which the butterfly valve element is supported for pivotal movement on a hollow shaft and the bimetallic temperature responsive means comprises a bimetallic strip coiled into a tubular element disposed in the hollow butterfly shaft and secured at one point thereto.

10. A valve mechanism according to claim 9 in which the hollow butterfly shaft is connected with the fluid pressure responsive means by a crank arm and connecting rod, movement of said fluid pressure responsive means being transmitted to said bimetallic tubular element by said butterfly shaft.

11. A valve mechanism according to claim 9 in which the butterfly and hollow shaft are provided with openings constructed to facilitate the flow of fluid from the passage into engagement with the bimetallic tubular element in all positions of said butterfly.

12. A valve mechanism according to claim 9 in which the bimetallic tubular element is secured at one end to the butterfly and shaft and is provided at the other end with an arm adapted to engage and actuate said bleed valve upon predetermined movement of said bimetallic tubular element in response to temperature variations.

* * * * *